(12) United States Patent
Yamamoto et al.

(10) Patent No.: US 9,753,127 B2
(45) Date of Patent: Sep. 5, 2017

(54) MEASUREMENT APPARATUS

(71) Applicant: DENSO CORPORATION, Kariya, Aichi-pref. (JP)

(72) Inventors: Hirofumi Yamamoto, Obu (JP); Shinichirou Taguchi, Nagoya (JP); Akira Miki, Kariya (JP)

(73) Assignee: DENSO CORPORATION, Kariya (JP)

( * ) Notice: Subject to any disclaimer, the term of this patent is extended or adjusted under 35 U.S.C. 154(b) by 423 days.

(21) Appl. No.: 14/538,205

(22) Filed: Nov. 11, 2014

(65) Prior Publication Data
US 2015/0153452 A1 Jun. 4, 2015

(30) Foreign Application Priority Data

Nov. 29, 2013 (JP) ................. 2013-247870

(51) Int. Cl.
*G01S 7/486* (2006.01)
*G01S 17/10* (2006.01)
*G01S 17/42* (2006.01)
*G01S 17/93* (2006.01)

(52) U.S. Cl.
CPC ............ *G01S 7/4865* (2013.01); *G01S 17/10* (2013.01); *G01S 17/42* (2013.01); *G01S 17/936* (2013.01)

(58) Field of Classification Search
CPC ..... G01S 7/4861; G01S 17/88; H03M 1/1245
See application file for complete search history.

(56) References Cited

U.S. PATENT DOCUMENTS

2015/0160346 A1* 6/2015 Stutz ...................... G01S 7/4861
356/5.01

FOREIGN PATENT DOCUMENTS

| JP | S62-42225 | A | 2/1987 |
| JP | 2001-351570 | A | 12/2001 |
| JP | 4345199 | B2 | 12/2001 |
| JP | 2006-053076 | A | 2/2006 |
| JP | 2006-64641 | A | 3/2006 |
| JP | 4525253 | B2 | 3/2006 |

OTHER PUBLICATIONS

Office Action issued Oct. 20, 2015 in the corresponding JP application No. 2013-247870 (with English translation).

* cited by examiner

*Primary Examiner* — Luke Ratcliffe
(74) *Attorney, Agent, or Firm* — Posz Law Group, PLC

(57) ABSTRACT

A measurement apparatus measuring a flight time of a search wave corresponding to a time after the search wave is emitted and before a reflected wave is received is provided. The measurement apparatus includes a transceiver, a memory portion, a sampling portion, a measurement portion, and a determination portion. The transceiver emits the search wave and receives the reflected wave. The sampling portion generates a sampling data and causes the memory portion to store the sampling data. The sampling portion includes a first processing unit and a second processing unit. The first processing unit causes the memory portion to store the sampling data as a first signal data. The second processing unit causes the memory portion to store the sampling data as a second signal data. The measurement portion measures the flight time and generates a measurement value of the flight time. The determination portion determines a sampling period.

13 Claims, 7 Drawing Sheets

MEASUREMENT APPARATUS

CROSS REFERENCE TO RELATED APPLICATION

This application is based on Japanese Patent Application No. 2013-247870 filed on Nov. 29, 2013, the disclosure of which is incorporated herein by reference.

TECHNICAL FIELD

The present disclosure relates to an apparatus measuring a flight time of a search wave.

BACKGROUND

Patent Literature 1: JP-A-1987-042225

Conventionally, a measurement apparatus measuring a distance is known. The measurement apparatus emits a search wave, measures a flight time of the search wave corresponding to a time from when the search wave is emitted to when a reflected wave is received, and measures the distance from the measurement apparatus to a front object. The search wave is a light pulse, which is a light signal having a pulse form, for example.

A mass spectroscope measures a flight time of a particle and calculates a mass spectrum of a sample (referring to patent literature 1). A signal of an observation object is sampled and stored in a memory in the mass spectroscope. In order to save a memory space, the signal in a predetermined time domain is sampled selectively and is stored in the memory.

The applicants of the present disclosure have found the following with respect to a measurement apparatus.

According to the measurement apparatus measuring the distance to the front object referring to the flight time, a distance measurement with high precision may be required to sample a receiving signal of a reflected wave with a high sampling frequency. However, when all receiving signals are sampled with the high sampling frequency, a memory space for a data accumulation may be increased.

In a technology field of a vehicle mounted apparatus, a receiving signal of a reflected wave may be sampled with a low sampling frequency, and the receiving signal of the reflected wave from a front object of a short distance having a short flight time may be selectively sampled with a high sampling frequency.

According to this manner, the distance of a distant front object may be immeasurable with high precision. In addition, in an measurement apparatus measuring a distance to an object positioned at a vehicle front, since a moving object such as a person, a vehicle or the like exists freely, it may be difficult to measure the distance to the front object with high precision irrespective of a distance in contrast to the mass spectroscope in which the time domain of a sampled object is set to a fixed domain.

SUMMARY

It is an object of the present disclosure to provide a technology by which a flight time of a search wave reflected on a front object is measurable with high precision irrespective of a distance to the front object from a measurement apparatus and a data amount stored for a measurement is reduced.

According to one aspect of the present disclosure, a measurement apparatus measuring a flight time of a search wave corresponding to a time after the search wave is emitted and before a reflected wave of the search wave is received is provided. The measurement apparatus includes a transceiver, a memory portion, a sampling portion, a measurement portion, and a determination portion. The transceiver emits the search wave, receives the reflected wave, and outputs a receiving signal. The sampling portion generates a sampling data of the receiving signal and causes the memory portion to store the sampling data. The sampling portion includes a first processing unit and a second processing unit. The first processing unit causes the memory portion to store the sampling data generated by sampling the receiving signal at a first sampling frequency as a first signal data. The second processing unit causes the memory portion to store the sampling data generated by sampling the receiving signal at a second sampling frequency, which is lower than the first sampling frequency, as a second signal data. The measurement portion measures the flight time based on the first signal data and the second signal data, and generates a measurement value of the flight time. The determination portion determines a sampling period of the receiving signal corresponding to the first signal data based on the measurement value of the flight time. The first processing unit causes the memory portion to selectively store the sampling data of the receiving signal in a specific period with an emission event of the search wave as a reference. The sampling data of the receiving signal corresponds to the first signal data. The specific period corresponds to the sampling period determined by the determination portion.

According to the measurement apparatus, it is possible to measure the flight time of the search wave reflected on the front object with high precision irrespective of a distance to the front object from the measurement apparatus and to reduce data amount stored for the measuring.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
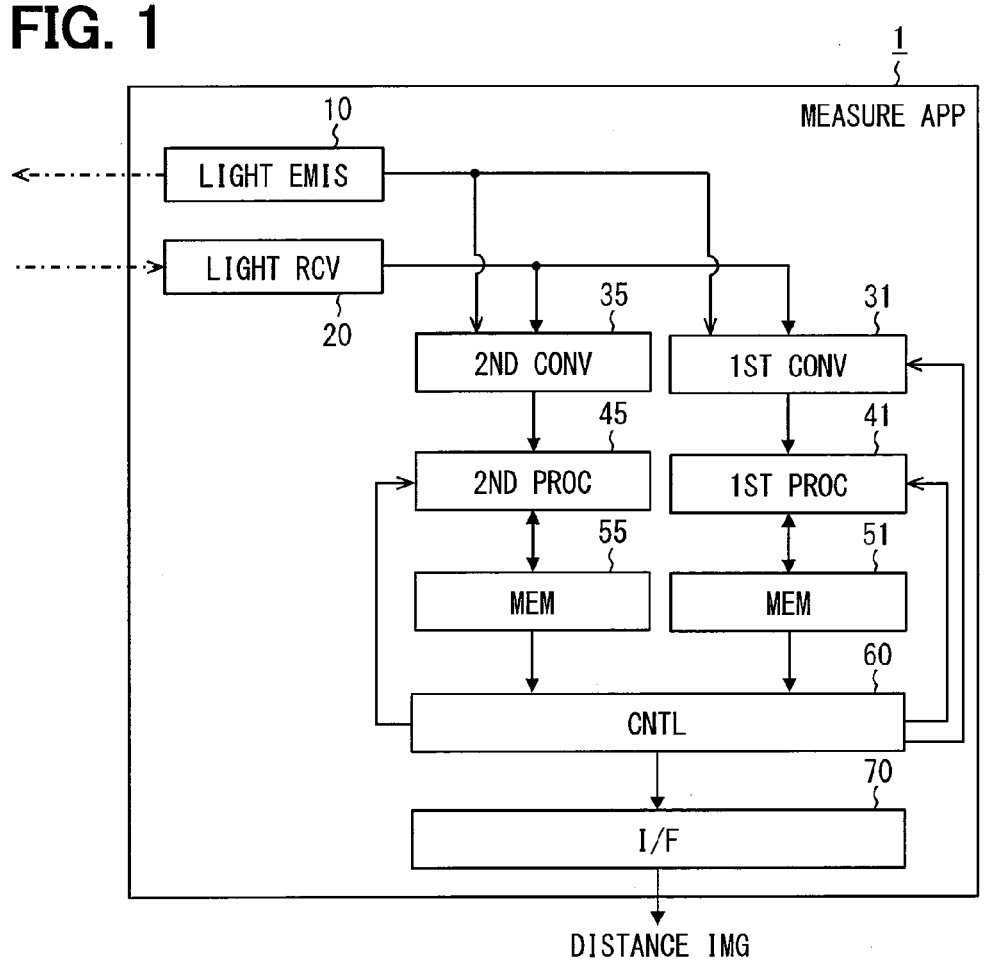
FIG. 1 is a block diagram showing a configuration of a measurement apparatus.

Embodiments of the present disclosure will be described with referring to the drawings.

Figure 4:
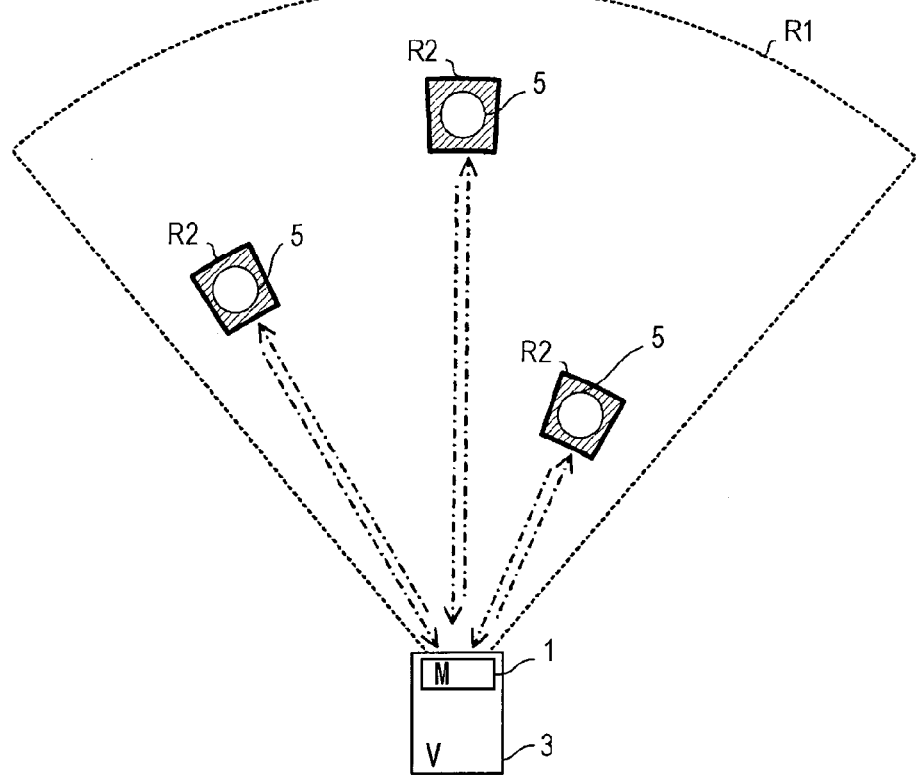
FIG. 4 is a drawing illustrating a measurement region with a low precision and a measurement region with high precision.

A measurement apparatus 1 in the present embodiment is mounted to a vehicle 3 (referring to FIG. 4). The vehicle 3 is also referred to a subject vehicle 3. The measurement apparatus 1 emits a light pulse to a front of the subject vehicle 3. The light pulse is a light signal of a pulse form. The measurement apparatus 1 receives a reflected light of the light pulse. The measurement apparatus 1 measures a flight time of the light pulse and measures a distance to a front object 5 from the measurement apparatus 1. The flight time corresponds to a time from when the light pulse is emitted to when the reflected light is received.

The measurement apparatus 1 is provided with a light emission unit 10, a light receiving unit 20, a first converter 31, a second converter 35, a first processing unit 41, a second processing unit 45, a first memory 51, a second memory 55, a control unit 60, and an interface 70 as illustrated in FIG. 1.

The light emission unit 10 emits the light pulse to a front of the subject vehicle 3. The light emission unit 10 receives an instruction from the control unit 60, and emits the light pulse in a specific number of times (N times) at each time when a distance measurement processing is initiated. Followingly, it is supposed that the specific number of times N is equal to ten (that is, N is equal to ten) as an example. It should be noted that the specific number of times N may be appropriately set up according to an intensity of the emitted light pulse.

The light receiving unit 20 is provided with a light receiving element (not shown) for each pixel to receive the reflected light, which corresponds to the light pulse emitted from the light emission unit 10. The reflected light is reflected on the front object 5 and is returned to the light receiving unit 20. The light receiving unit 20 is provided with the light receiving element for each pixel. A pixel is defined by dividing a front visual field receiving the reflected light. Each of the light receiving elements inputs the receiving signal of an incident light including the reflected light to the first converter 31 and the second converter 35. The receiving signal for each of the light receiving elements (that is, for each of the pixels) represents an intensity of the incident light received by the corresponding light receiving element.

The first converter 31 is an analog-to-digital converter. The first converter 31 samples the receiving signal for each pixel inputted from the light receiving unit 20, and generates a sampling data for each pixel. The sampling data for each pixel represents a receiving intensity of the incident light to the corresponding pixel. The first converter 31 samples the receiving signal with a first sampling frequency f1 for each pixel and inputs the sampling data corresponding to the receiving signal into the first processing unit 41. Incidentally, the first sampling frequency f1 is set up in advance.

The second converter 35 is an analog-to-digital converter as similar to the first converter 31. The second converter 35 samples the receiving signal for each pixel inputted from the light receiving unit 20 with a second sampling frequency f2, generates a sampling data for each pixel, and inputs the sampling data into the second processing unit 45. The second sampling frequency f2 is set up in advance.

The second sampling frequency f2 is sufficiently lower than the first sampling frequency f1. Accordingly, in the first converter 31, the sampling data with a resolution higher than the sampling data by the second converter 35 is generated. In other words, in the first converter 31, the sampling data whose time resolution is higher than the sampling data by the second converter 35 is generated.

In detail, the light emission unit 10 outputs a trigger signal simultaneously with an emission event of the light pulse and the second converter 35 receives the trigger signal. The second converter 35 samples the receiving signal for each pixel in each of the emissions of the light pulses based on the trigger signal from when the emission event of the light pulse to when a determined time is passed. Incidentally, the emission event means a time when the light pulse is emitted. The second converter 35 samples the receiving signal, and inputs to the second processing unit 45 the sampling data for each pixel. The sampling data for each pixel is obtained by sampling the receiving signal in each pixel, which is received by the light receiving unit 20 during the determined time. The determined time corresponds to a time required for a completion from the emission of the light pulse to a receiving of the reflected light in a case where the light pulse is reflected at the farthest point where a distance is measurable. Hereinafter, the determined time when the second converter 35 samples the receiving signal for each of the emissions of the light pulse may also be referred to as a standard measurement period.

The first converter 31 samples the receiving signal for each pixel inputted from the light receiving unit 20 only within a predetermined sampling period (corresponding to a specific period) in the standard measurement period. The first converter 31 inputs the sampling data to the first processing unit 41. The sampling data inputted by the first converter 31 is generated by sampling the receiving signal in the specific period corresponding to the sampling period. The sampling period is determined based on a time axis having the emission event of the light pulse as a zero point. The sampling period is individually determined for each pixel with the control unit 60 based on a past distance measurement result.

Specifically, the first converter 31 detects the emission of the light pulse based on the trigger signal inputted from the light emission unit 10 simultaneously with each of the emissions of the light pulse. The first converter 31 selectively samples the receiving signal during the specific period with the emission event of the light pulse as a reference. The specific period corresponds to the sampling period. The first converter 31 inputs the sampling data during the specific period to the first processing unit 41 selectively. The specific period is determined as the sampling period in advance.

The first processing unit 41 unifies the sampling data inputted from the first converter 31 for each pixel with respect to each of the emission operations of N times of the light pulse, at each initiation of the distance measurement processing. As described above, the light emission unit 10 performs the emission operation of the light pulse in N times. The first processing unit 41 causes the first memory 51 to store the integrated data for each pixel, which is generated, as a first signal data for each pixel.

Specifically, the first processing unit 41 causes the first memory 51 to store the sampling data as an intermediate data corresponding to the first signal data when the first processing unit 41 receives the sampling data from the first converter 31 according to the first emission operation. At each termination of the second and subsequent emission operations, the first processing unit 41 adds the receiving intensity at each time represented by the sampling data, which is inputted from the first converter 31 according to the emission operation, to the receiving intensity at each time represented by the intermediate data, which is stored in the first memory 51, for each of the identical time. The receiving intensity at each time represented by the intermediate data is updated. Incidentally, the time mentioned in the present embodiment represents a time on the time axis having the emission event of the light pulse as the zero point. Therefore, the processing adding the receiving intensity of the identical time corresponds to a processing adding a receiving intensity at a time when the identical period is passed after the emission event of the light pulse.

Figure 2:
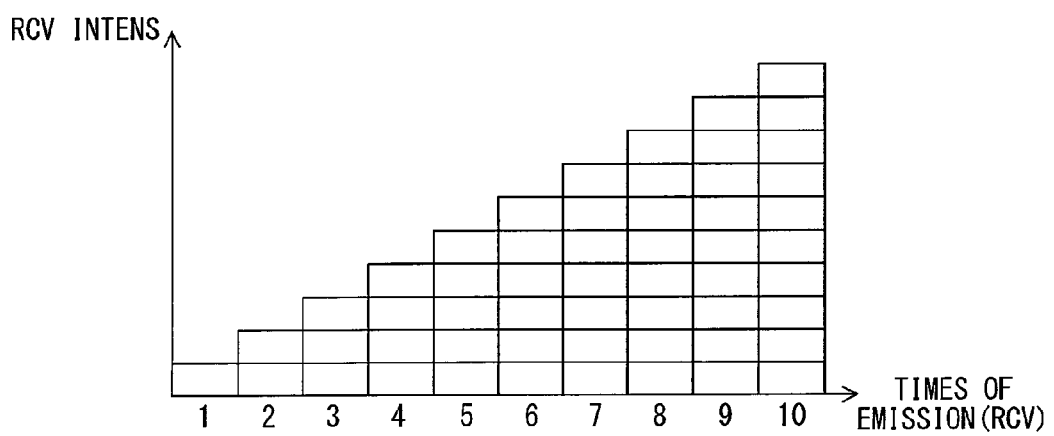
FIG. 2 is a drawing illustrating a generation operation of a first signal data by a first processing unit and the generation operation of a second signal data based on a second processing unit.

The first processing unit 41 generates the intermediate data, which is generated by accumulating the receiving intensity of each time illustrated by the sampling data obtained by each of the emission operations from the first time to the this time for each time for each of the N times of the emission operation, as illustrated in FIG. 2. When an accumulation of the receiving intensities corresponding to the N times of the emission operations is completed, the first processing unit 41 causes the first memory 51 to store the intermediate data in which the accumulation has been completed, as the first signal data.

By the same principle of the first processing unit 41, the second processing unit 45 also unifies the sampling data inputted from the second converter 35 for each pixel with respect to each of the N times of the emission operations of the light pulse at each initiation of the distance measurement processing. Incidentally, the light emission unit 10 performs the emission operation of the light pulse as described above. The second processing unit 45 causes the second memory 55 to store the integrated data for each pixel as a second signal data for each pixel.

As described above, the second processing unit 45 generates the intermediate data, which is generated by accumulating the receiving intensity of each time represented by the sampling data obtained from the second converter 35 for each of the emission operations from the first time to this time for each time for each of the N times of the emission operations. When the receiving intensities corresponding from the first time to the N times of the emission operations is accumulated, the second processing unit 45 causes the second memory 55 to store the intermediate data after an completion of the accumulation as the second signal data.

Figure 3:
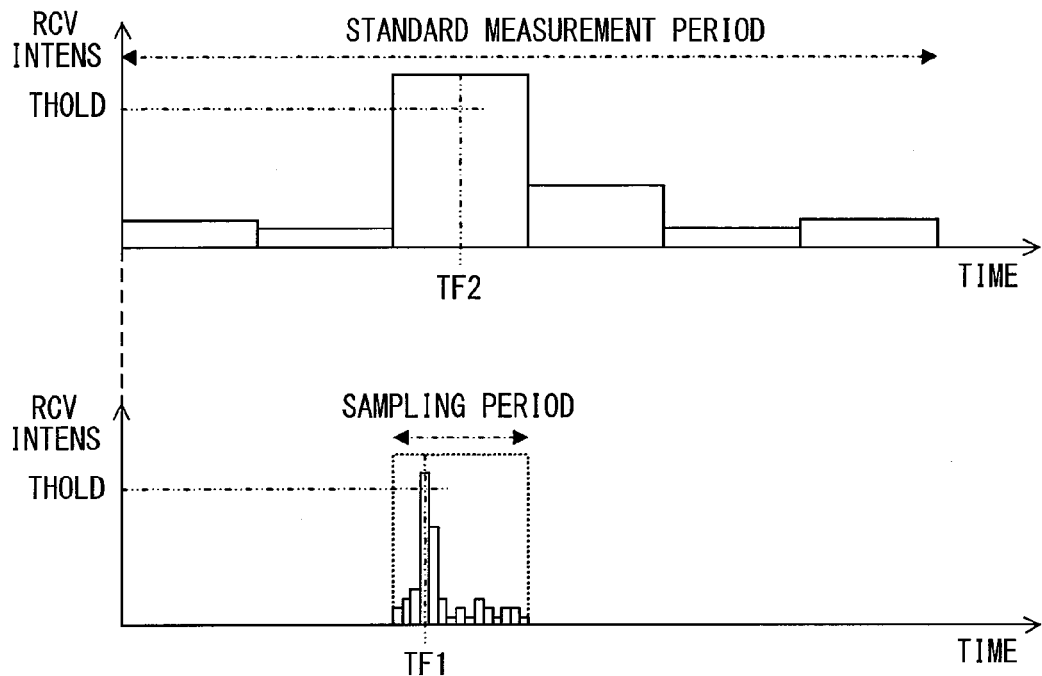
FIG. 3 is a drawing explaining a relationship between the first signal data and the second signal data.

FIG. 3 illustrates an example of the second signal data stored by the second memory 55. FIG. 3 illustrates an example of the first signal data stored by the first memory 51. As illustrated in FIG. 3, the second signal data for each pixel represents the receiving intensity of the incident light to the pixel for each time unit of a cycle 1/f2 corresponding to the second sampling frequency f2. The second signal data represents the receiving intensity in the standard measurement period by the time unit.

As illustrated in FIG. 3, the first signal data for each pixel represents the receiving intensity of the incident light to the pixel for each time unit of a cycle 1/f1 corresponding to the first sampling frequency f1. The first signal data represents the receiving intensity of the specific period in the standard measurement period by the time unit. According to the present example illustrated in FIG. 3, a time length of the sampling period having information of the receiving intensity with respect to the first signal data corresponds to the cycle 1/f2. Alternatively, the time length of the sampling period may be set up as a predetermined times (for example, twice and three times) of the cycle 1/f2. The time length of the sampling period may be arbitrarily set up irrespective of the second sampling frequency f2.

The control unit 60 measures the flight time of the light pulse for each pixel based on the first signal data of the pixel stored by the first memory 51 and the second signal data of the pixel stored by the second memory 55. The control unit 60 generates a distance image data in front of the subject vehicle 3 based on a measurement value TF of the flight time for each pixel. The control unit 60 outputs the distance image data to an external device through the interface 70. The distance image data represents a distance from the subject vehicle 3 to the front object 5 for each pixel.

Specifically, the control unit 60 calculates the measurement value TF of the flight time as follows using the first signal data and the second signal data of the pixel for each pixel. The control unit 60 detects a time when the receiving intensity represents the maximum value in the first signal data of the corresponding pixel. The time detected by the control unit 60 corresponds to a center time of a section whose receiving intensity is maximal. When the receiving intensity at this time is equal to or greater than a threshold value, it is considered that this time is the receiving time of the reflected light, and an elapsed time TF1 from the emission of the light pulse to the receiving of the light pulse is determined as a candidate of the measurement value TF of the flight time.

The control unit 60 detects a time when the receiving intensity represents the maximum value in the second signal data of the corresponding pixel. When the receiving intensity at this time is equal to or greater than a threshold value, it is considered that this time is the receiving time of the reflected light, and an elapsed time TF2 from the emission to the receiving of the light pulse is determined as a candidate of the measurement value TF of the flight time.

The control unit 60 selects the time TF1 as the measurement value TF of the flight time when an error between the time TF2 and the time TF is less than a reference value, which is defined in advance. The control unit 60 selects the time TF2 as the measurement value TF of the flight time when the error is equal to or more than the reference value. When the error is equal to or more than the reference value, the time TF2 is selected since a reliability of the time TF1 based on the receiving signal of the specific period in the standard measurement period as the flight time is lower than a reliability of the time TF2.

The control unit 60 calculates the measurement value TF for each pixel based on the above selection manner. In addition, the control unit 60 calculates a distance D from the subject vehicle 3 to the front object 5 included in the pixel by using the measurement value TF of the pixel for each pixel. The front object 5 is a reflection source of the light pulse that is incident to the pixel. The control unit 60 multiples the measurement value TF by one half of a propagation velocity V of the light pulse, so that the control unit 60 calculates the distance D (corresponding to V×TF/2) from the measurement apparatus 1 to the front object 5 corresponding to the measurement value TF.

The control unit 60 outputs the distance image data, which describes the distance D of each pixel and is calculated in the above manner, to the external device through the interface 70. The external device may include an electronic control unit performing a driving support of the subject vehicle 3, an electronic control unit performing a follow-up control of the subject vehicle 3 to a front vehicle, and an electronic control unit performing a brake control of the subject vehicle 3, for example.

The control unit 60 predicts a motion of the front object 5 included in the distance image data based on a temporal change of the distance image data including from a past distance image data to the latest distance image data using a known technology such as a Kalman filter. According to the predicted position of the front object 5 in the next distance measurement event, the control unit 60 determines the sampling period of each pixel, which is set up to the first converter 31. Specifically, the control unit 60 causes the first memory 51 to store the sampling data when the prediction is correct, as the first signal data. The control unit 60 sets up an individual sampling period to the first converter 31 for each pixel. The sampling data corresponds to the receiving signal of the light pulse reflected on each front object 5.

Therefore, the control unit 60 selectively samples the receiving signal of the light pulse at the sampling frequency f1 at a reflection region R2 (corresponding to the reflection region R2 surrounded by a thick line in FIG. 4) where it is predicted that the front object 5 exists in a front region R1 (corresponding to the front region R1 surrounded by a broken line in FIG. 4) where a distance from the measurement apparatus 1 to the front object 5 is measurable based on the second signal data. The control unit 60 causes the first memory 51 to store the first signal data corresponding to the receiving signal of the light pulse. An arrow illustrated by a dashed line in FIG. 4 to FIG. 7 describes a propagation direction of the light pulse schematically. Incidentally, the first sampling frequency f1 is higher than the second sampling frequency f2 as mentioned above.

To sampling of the receiving signal using the first sampling frequency f1 may increase the data amount for sampling. However, according to the present embodiment, the sampling data is generated with respect to a limited region (that is, the reflection region R2) where it is predicted that the front object 5 exists. Therefore, according to the present embodiment, it may be possible to reduce the data amount for the sampling and to measure the flight time of the light pulse reflected on the front object 5 with high precision irrespective of a distance to the front object 5.

Figure 5:
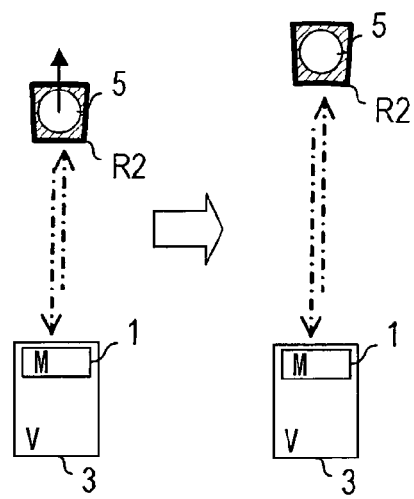
FIG. 5 is a drawing illustrating a first switching over example in a sampling period.
Figure 6:
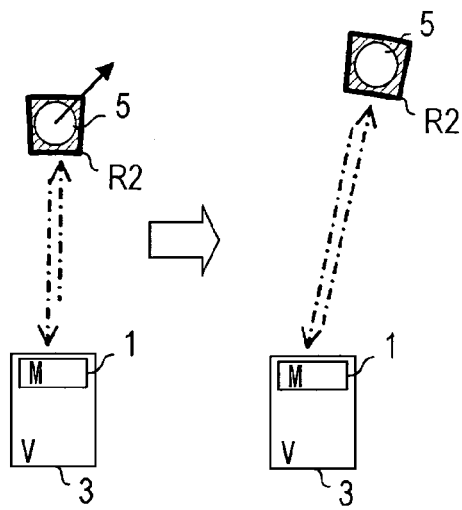
FIG. 6 is a drawing illustrating a second switching over example in the sampling period.

A setting rule of the sampling period will be explained with referring to FIG. 5 to FIG. 7. The reflection region R2 of the light pulse in FIG. 5 to FIG. 7 corresponds to the receiving signal sampled by setting the sampling period. FIG. 5 illustrates a change of the sampling period when the front object 5 moves from a position illustrated in a left part of FIG. 5 to a position illustrated in a right part of FIG. 5, by surrounding the reflection region R2 of the receiving signal with the thick line. In FIG. 5, the reflection region R2 of the receiving signal is sampled during the sampling period. Incidentally, the front object 5 moves to a direction away from the subject vehicle 3 in FIG. 5.

The arrow illustrated with a solid line in the left part of FIG. 5 describes a movement direction of the front object 5. According to the similar rule of FIG. 5, the front object 5, the reflection region 2 corresponding to the sampling period, and the arrow are illustrated in FIG. 6 and FIG. 7.

As described in FIG. 5, when it is predicted that the front object 5 moves along the propagation direction of the light pulse, the control unit 60 causes the first converter 31 to set up the sampling period corresponding to the pixel in each execution of the distance measurement processing so that the sampling period of the pixel is changed following the motion of the front object 5.

The control unit 60 sets up the sampling period as follows when it is predicted that the front object 5 moves along a direction crossing the propagation direction of the light pulse as described in FIG. 6. The control unit 60 detects a switchover of pixels including the front object 5 by referring to a prediction result of the motion of the front object 5. At the initiation time of the distance measurement processing, the control unit 60 sets up the sampling period of the pixel corresponding to a movement destination of the front object 5 for sampling the receiving signal of the light pulse reflected on the front object 5. The control unit 60 does not set up the sampling period to the first converter 31 with respect to the sampling period of the pixel that does not include the front object 5. The control unit 60 instructs the first converter 31 not to execute the sampling operation for the receiving signal of the pixel that does not include the front object 5.

Incidentally, a position or shape of the front object 5 may be basically specified only about a surface (a reflection surface) of the front object 5 positioned to a side of the measurement apparatus 1. The surface of the front object 5 reflects the light pulse. Thus, the control unit 60 sets up the sampling period of each pixel on a basis of the position of the reflection surface of the front object 5. Incidentally, the position of the reflection surface of the front object 5 is predicted from a past distance measurement result. The receiving signal corresponding to a peripheral region including the reflection surface is sampled.

Figure 7:
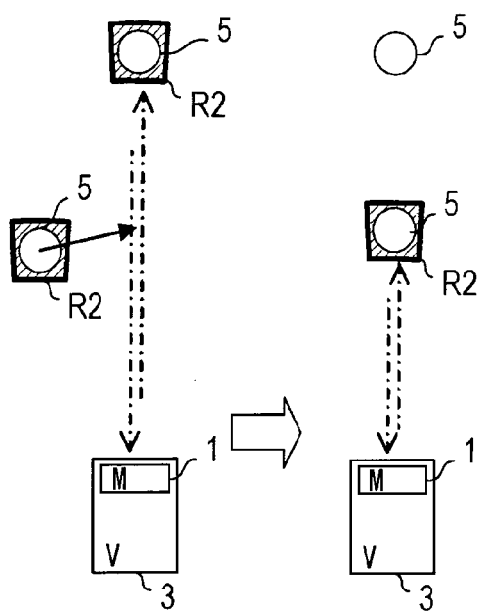
FIG. 7 is a drawing illustrating a third switching over example in the sampling period.

In addition, as described in FIG. 7, with respect to the pixel that the front objects 5 exist on the propagation path of the light pulse, when it is predicted that another front object 5 (referred to as a notable front object 5) may appear in front of the front object 5, the control unit 60 selects the notable front object 5 and sets up the sampling period of the pixel based on the predicted position of the closest front object 5.

According to the prediction result of the movement of the front objects 5, the control unit 60 specifies the front object 5 that is predicted to be the closest to the measurement apparatus 1 on the propagation path of the light pulse corresponding to the pixel. Specifically, among the front objects 5 whose propagation paths overlap each other on the propagation path of the light pulse corresponding to the pixel, the control unit 60 selects the front object 5 positioned closest to the measurement apparatus 1. The control unit 60 sets up the sampling period of the pixel so that the sampling data corresponding to the receiving signal of the light pulse reflected on the front object 5 (corresponding to the notable front object 5) is stored to the first memory 51 as the first signal data.

The sampling period is set up according to the above manner since the light pulse emitted from the light emission unit 10 does not reach the front object 5 positioned behind the closest front object 5 on the propagation path of the light pulse. The light receiving unit 20 does not receive a reflected light from the front object 5 positioned behind the closest front object 5 basically.

Therefore, the control unit 60 sets up the sampling period corresponding to the position of the front object 5 predicted to be located the closest to the control unit 60 (in other words, positioned closest to the measurement apparatus 1) for each pixel on the propagation path of the light pulse corresponding to the pixel. With respect to the pixel predicted that the front object 5 does not exist, the control unit 60 instructs the first converter 31 not to execute the sampling operation of the receiving signal the pixel. It may be possible to reduce an energy consumption of the measurement apparatus 1 by not performing the sampling operation with respect to the pixel predicted that the front object 5 does not exist.

A detail of the distance measurement processing performed by the control unit 60 will be explained with referring to FIG. 8 to FIG. 11. For example, the control unit 60 includes a microcomputer, and the microcomputer executes a program performing the processing according to a flowchart illustrated in FIG. 8 to FIG. 11. The program is stored to an internal memory (not shown) of the control unit 60, for example. Alternatively, the control unit 60 may include an exclusive hardware circuit to execute the processing. Alternatively, the control unit 60 may perform the processing by a combination of the microcomputer and the exclusive hardware circuit.

Figure 8:
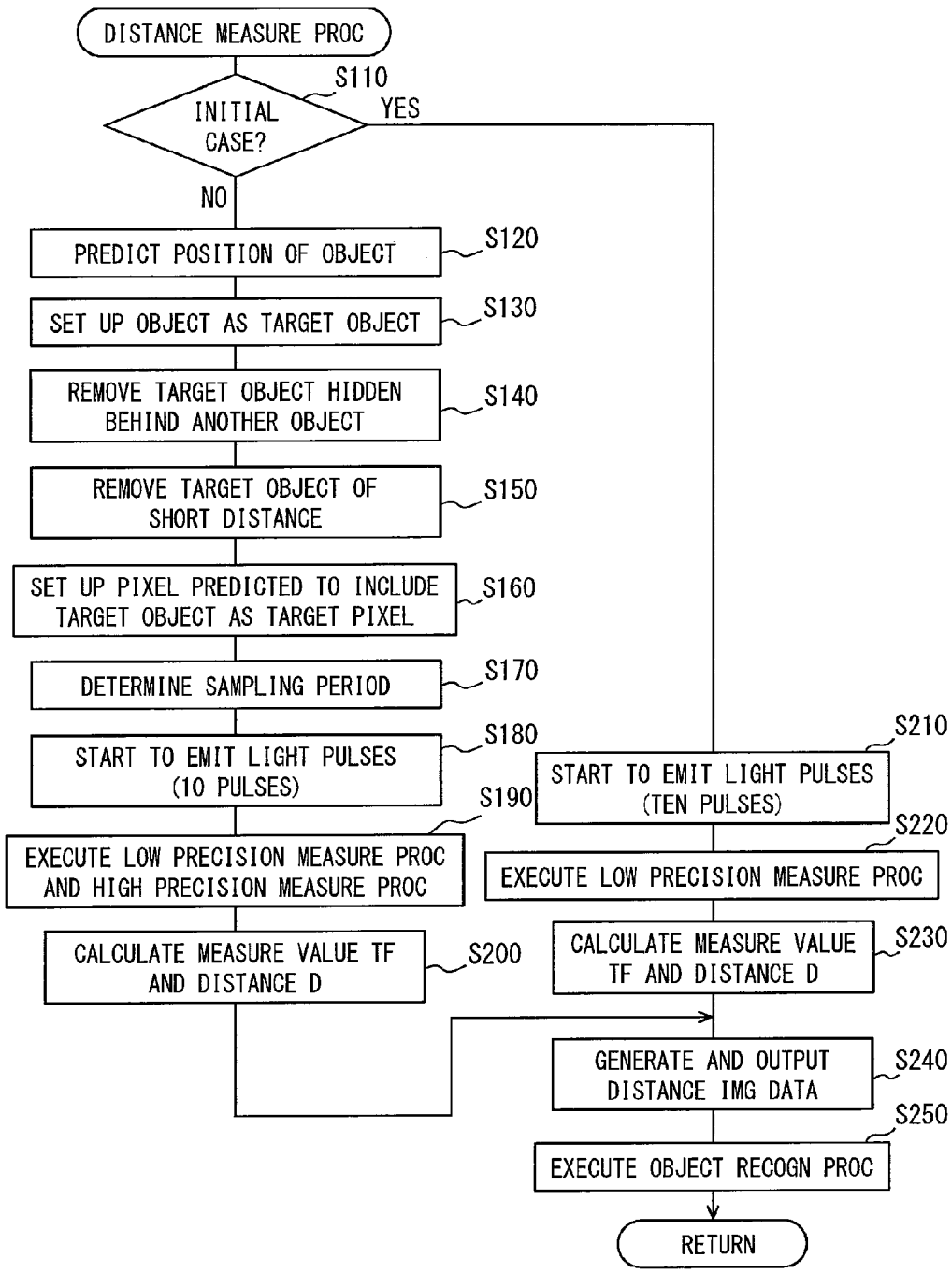
FIG. 8 is a flowchart illustrating a distance measurement processing executed by a control unit.
Figure 9:
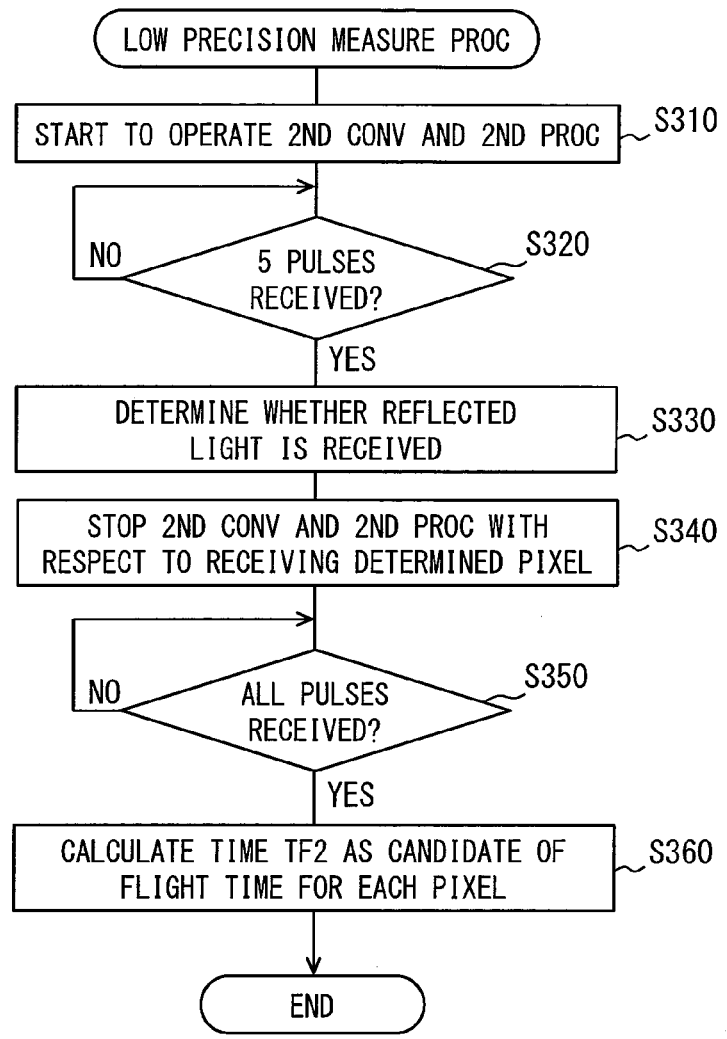
FIG. 9 is a flowchart illustrating a low precision measurement processing executed by the control unit.

The control unit 60 repeatedly performs the distance measurement processing illustrated in FIG. 8 periodically after startup of the measurement apparatus 1. The control unit 60 generates and outputs the distance image data periodically.

When the distance measurement processing is started up, the control unit 60 determines whether the execution of the distance measurement processing is an initial case (S110). When the control unit 60 determines that the execution is the initial case (S110: YES), the processing moves to S210, and the control unit 60 instructs the light emission unit 10 to start the emission operation of the light pulse for the specific number of times N (corresponding to ten times in the present embodiment). The processing moves to a S220 to execute a low precision measurement processing described in FIG. 9.

When the low precision measurement processing is started, the control unit 60 instructs the second converter 35 to generate the sampling data of the standard measurement period for each emission of the light pulse with respect to all pixels, and instructs the second processing unit 45 to generate the intermediate data and the second signal data based on the sampling data to store the intermediate data and the second signal data to the second memory 55 (S310). According to this instruction, with respect to all pixels, the second converter 35 generates the sampling data for each pixel, and the second processing unit 45 generates the intermediate data and the second signal data for each pixel and stores the intermediate data and the second signal data to the second memory 55.

After the instruction, the control unit 60 waits until the first to fifth emission operations are performed among the ten times of the emission operations and the second processing unit 45 generates the intermediate data for each pixel. The intermediate data is obtained by accumulating the receiving intensities of the standard measurement period.

When the intermediate data is generated (S320: YES), the control unit 60 determines whether the reflected light is received for each pixel based on the intermediate data of the pixel with respect to all pixels (S330). Specifically, the control unit 60 refers to the receiving intensity of each time represented by the intermediate data of the pixel for each pixel and performs the following processing. That is, the control unit 60 detects a point of time when the receiving intensity has a maximum value in the intermediate data of the pixel. When the maximum value is less than the threshold value, the control unit 60 determines that light receiving unit 20 does not receive the reflected light, and when the maximum value is equal to or more than the threshold value, the control unit 60 determines that the light receiving unit 20 receives the reflected light. Accordingly, the control unit 60 detects the receiving of the reflected light.

A pixel determined that the reflected light is received is referred to as a receiving determined pixel. With respect to the receiving determined pixel, the control unit 60 instructs the second converter 35 to stop generating the sampling data of the pixel and instructs the second processing unit 45 to stop updating the intermediate data of the pixel during a remaining period until the present distance measurement processing is completed (S340). Incidentally, the receiving determined pixel corresponds to the pixel that the control unit 60 determines that the reflected light is received.

The control unit 60 waits until the remaining emission operation is completed and the second processing unit 45 generates the second signal data in each pixel. The second signal data is obtained by accumulating the receiving intensity of the standard measurement period from the first to tenth emission operations (S350).

When the second signal data for each pixel is generated and is stored in the second memory 55 (S350: YES), the control unit 60 calculates the time TF2 (referring to FIG. 3), which corresponds to a candidate of the flight time of the light pulse based on the second signal data of the pixel for each pixel (S360). Incidentally, with respect to each receiving determined pixel, the time TF2 is calculated considering the intermediate data, which is generated before the updating operation of the intermediate data is completed at S340, as the completed second signal data. The intermediate data corresponds to a data obtained by accumulating the first to fifth receiving intensities.

With respect to a pixel whose maximum value of the receiving intensity is less than the threshold value in the second signal data, the control unit 60 considers that the reflected light is not received and the time TF2 is not calculated. The control unit 60 ends the low precision measurement processing, and the processing moves to S230. At S230, with respect to the pixel that the time TF2 is calculated in the low precision measurement processing, the control unit 60 determines the time TF2 of the pixel as the measurement value TF of the flight time of the light pulse to the pixel for each pixel. The control unit 60 calculates the distance D (corresponding to V×TF/2) from the measurement apparatus 1 to the front object 5 included in the pixel.

The processing moves to S240, and the control unit 60 generates the distance image data describing the distance D of each pixel calculated at S230. The control unit 60 outputs the distance image data to the external device through the interface 70. The distance image data is, for example, configured from a data in which a region of the pixel that the distance D is not calculated at S230 is filled with blank or includes a prescribed maximum value.

The control unit 60 analyzes the distance image data, and performs an object recognition processing of the front object 5 included in the distance image data by a known technique (S250). The object recognition processing performed at S250 identifies a pixel group including an identical front object 5, recognizes each front object 5 included in distance image data, and recognizes whether the front object 5 is a moving object or a static object. Since the object recognition processing considers the past result (corresponding to the distance image data) of the distance measurement, it may be possible to recognize whether the front object 5 is the moving object or the static object. The motion of the recognized front object 5 is predicted by using a prediction device such as a Kalman filter, for example. The control unit 60 executes the object recognition processing, and ends the distance measurement processing temporarily.

When the control unit 60 determines that the execution of the distance measurement processing is not the initial case at S110, the processing moves to S120. At S120, the control unit 60 predicts a position of each front object 5 at this emission event of the light pulse with respect to each front object 5 recognized in a previous object recognition processing. For example, the control unit 60 inputs the position of each front object 5 specified based on the distance image data at the previous object recognition processing (S250) and a time series data of the positions of the front object 5 obtained at the previous distance measurements to the prediction device. The control unit 60 predicts the position at this emission event of the light pulse with respect to each front object 5.

The control unit 60 determines each front object 5, which is predicted to exist in the front region R1 (corresponding to the front region R1 surrounded with a broken line in FIG. 4) where a distance is measurable as a target object (S130). The front object 5 hidden behind another front object 5 among the target objects determined by S130 is removed from the target objects (S140). Herein, the target object hidden behind another target object corresponds to the front object 5 predicted to position behind another target object as described in FIG. 7.

In addition, the control unit 60 removes the front object 5 predicted to exist near the subject vehicle 3 from the target object of the remained target objects (S150). For example, the front object 5 predicted to exist within a predetermined distance from the subject vehicle 3 is removed from the target object.

The front object 5 existing within the predetermined range (that is, near the subject vehicle 3) is removed from the target object at S150, since, with respect to the pixel that the front object 5 exists near the subject vehicle 3, it is possible to generate the first signal data representing the receiving intensity enough to measure the flight time. In this case, the receiving intensity is obtained by accumulating the receiving intensity from a halfway of the emission operation instead of accumulating the receiving intensity of the light pulse for ten pulses by the first processing unit 41.

In the present embodiment, with respect to the pixel that the front object 5 is predicted to position near the subject vehicle 3, the first converter 31 does not perform the sampling operation of the receiving signal and the first processing unit 41 does not generate the first signal data until the fifth emission operation of the light pulse is completed in the first to tenth emission operations of the light pulse.

Figure 10:
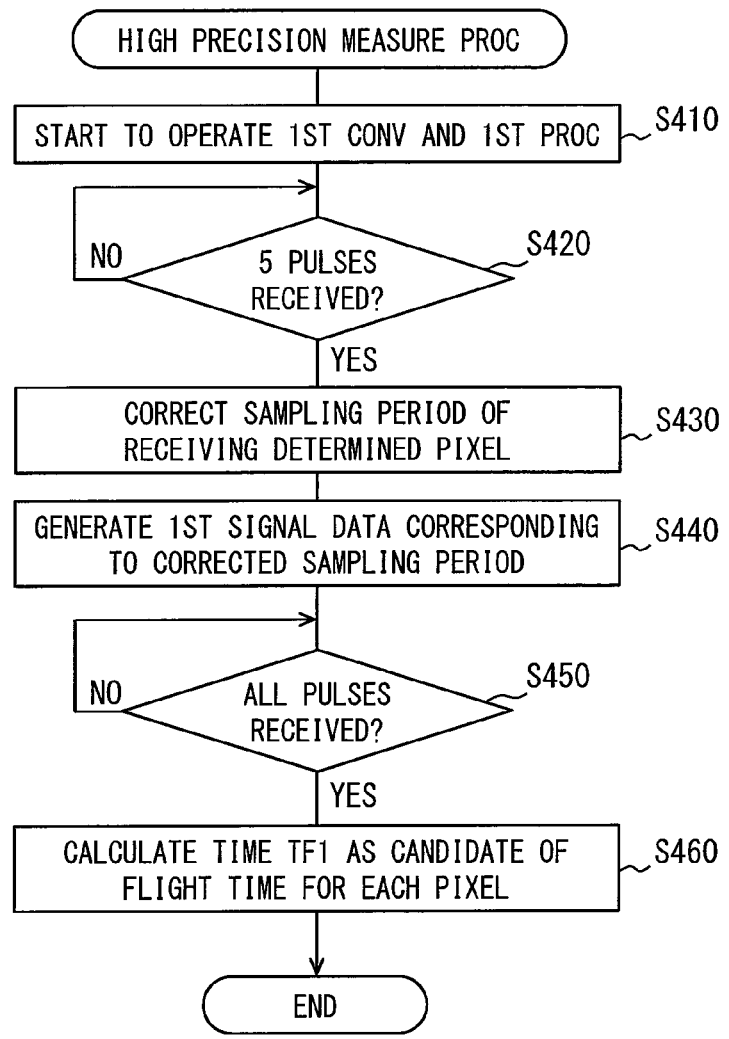
FIG. 10 is a flowchart illustrating a high precision measurement processing executed by the control unit.
Figure 11:
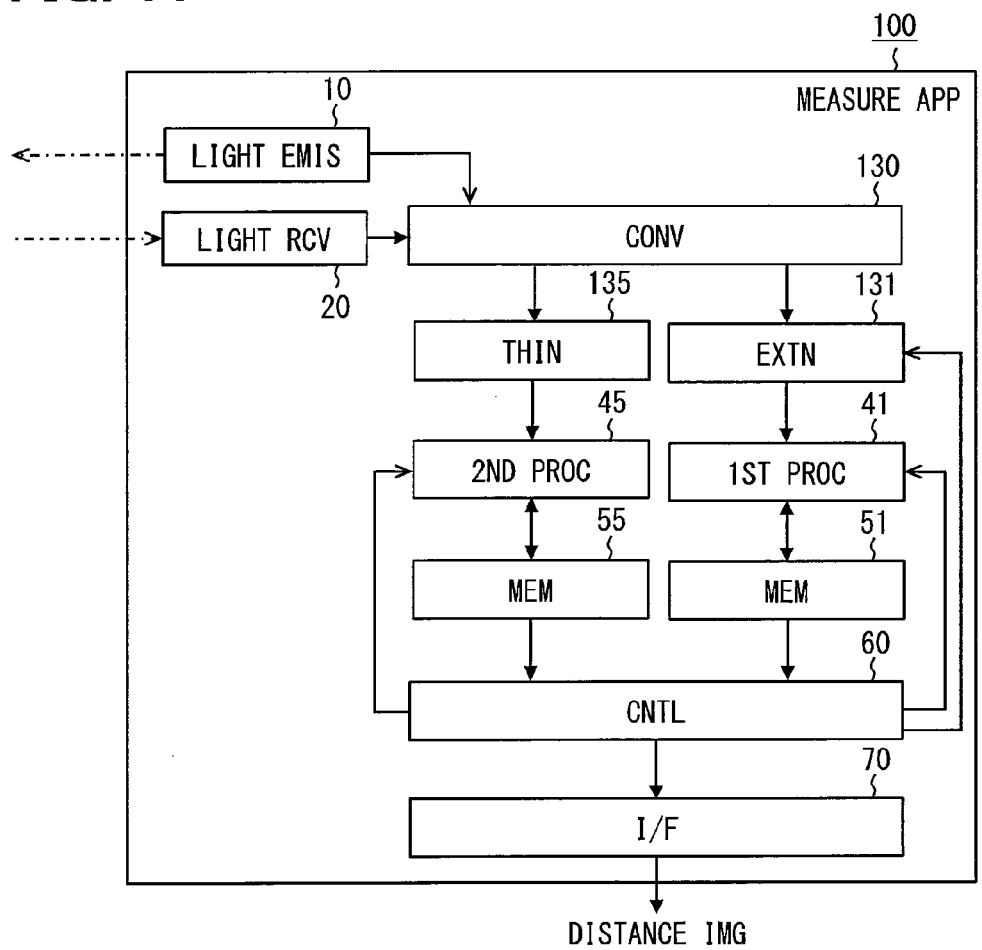
FIG. 11 is a block diagram illustrating a configuration of the measurement apparatus in a modification.

In other words, the receiving determined pixel including the front object 5 is specified based on the intermediate data, which is generated by the second processing unit 45 (S330), and then, the first converter 31 and the first processing unit 41 sample the receiving signal and generate the first signal data from the sixth emission operation and the subsequent emission operation of the light pulse (S440 described in FIG. 10). Accordingly, in the present embodiment, it may be possible to measure the time TF1 corresponding to the pixel that the front object 5 is positioned at a short distance from the subject vehicle 3 effectively and precisely.

When the processing at S150 is completed, the control unit 60 sets up a pixel corresponding to the predicted position of each target object as a target pixel (S160). At S160, the control unit 60 may not set up any pixel as the target pixel. In other words, no target pixel may be set up.

The control unit 60 determines the sampling period that is set up to the first converter 31 for each target pixel (S170). Therefore, the control unit 60 determines the sampling period of the target pixel based on the prediction position of the target object predicted to be included in the pixel for each target pixel, so that the sampling data corresponding to the receiving signal of the light pulse reflected on the target object is stored to the first memory 51 as the first signal data. The sampling period may be determined as a predetermined period having a receiving time of the predicted (estimated) reflected light as the center.

When the sampling period of each target pixel is determined, the processing moves to S180. At S180, the control unit 60 instructs the light emission unit 10 to start the emission operation of the specified times N (being equal to ten) of the emission operation of the light pulse (S180). The control unit 60 executes the low precision measurement processing illustrated in FIG. 9 and the high precision measurement processing illustrated in FIG. 10 (S190).

When the high precision measurement is initiated, the control unit 60 determines the sampling period of each target pixel determined at S170 to the first converter 31. In addition, the control unit 60 instructs the first converter 31 to generate the sampling data based on the receiving signal during the sampling period for each emission of the light pulse to each target pixel, and instructs the first processing unit 41 to generate the first signal data and store the first signal data to the first memory 51 (S410). By removing the pixel other than the target pixel from an object of the instruction at S410, the control unit 60 indirectly instructs the first converter 31 and the first processing unit 41 not to perform the sampling operation of the receiving signal of each pixel other than the target pixel and not to generate the first signal data.

The control unit 60 waits until the first to fifth emission operations of the light pulse complete and the low precision measurement processing at S330 is completed (S420). When the low precision measurement processing at S330 is completed (S420: YES), the control unit 60 corrects the sampling period of each receiving determined pixel determined that the reflected light is received at S330 (S430).

A prescribed time in the present disclosure may correspond to a time after a measurement processing in the fifth emission operation is completed and before the sixth emission operation is completed.

Specifically, the control unit 60 refers to the intermediate data of the pixel stored by the second memory 55 for each of the receiving determined pixels and detects the receiving time of the light pulse. The control unit 60 corrects the sampling period determined into the first converter 31 on a basis of the receiving time of the light pulse. For example, the control unit 60 corrects the sampling period of the pixel to a predetermined period having the receiving time as the center. Timing for correcting the sampling time corresponds to timing after the sampling of the receiving signal corresponding to the fifth emission operation and before the sixth emission operation of the light pulse.

Incidentally, a group of the receiving determined pixels whose sampling period is corrected includes the target pixel set up at S160 and a pixel other than the target pixel set up at S160. With respect to the receiving determined pixel that is not set up as the target pixel, the sampling period is newly set up to the first converter 31 based on the detected receiving time instead of correcting the sampling period, substantially.

The control unit 60 instructs the first converter 31 to generate the sampling data based on the receiving signal of the corrected sampling period for each emission of the light pulse for each receiving determined pixel, and instructs the first processing unit 41 to generate the first signal data and store the first signal data to the first memory 51. In addition, the control unit 60 instructs the first memory 51 to erase the intermediate data of the receiving determined pixel stored in the first memory 51 temporarily (S440).

According to this instruction, with respect to each receiving determined pixel, the first memory 51 stores the first signal data. The first signal data corresponds to a data obtained by accumulating the receiving intensities represented by the sampling data for each time. The sampling data is obtained from the sixth to tenth emission operations, which correspond to a remaining emission operation. With respect to the target pixel not fall under the receiving determined pixel, the first memory 51 stores the data generated by accumulating the receiving intensities represented by the sampling data obtained from the first to tenth emission operations, as the first signal data.

When the control unit 60 completes the remaining sixth to tenth emission operations and the first signal data of each pixel is generated with respect to the receiving determined pixel and the target pixel other than the receiving determined pixel (S450: YES), the processing moves to S460.

At S460, with respect to the receiving determined pixel and the target pixel other than the receiving determined pixel, the control unit 60 calculates the time TF1 (referring to FIG. 3), which is a candidate of the flight time of the light pulse, based on the first signal data of the pixel for each pixel. With respect to a pixel whose maximum value of the receiving intensity in the first signal data is less than a threshold value, it is considered that the reflected light is not received and the time TF1 is not calculated.

When the control unit 60 completes the low precision measurement processing and the high precision measurement processing initiated at S190, the processing moves to S200. At S200, the control unit 60 performs the following processing for each pixel with respect to the pixel that the time TF1 is calculated at the high precision measurement processing. The control unit 60 compares the time TF1 of the pixel with the time TF2 of the identical pixel calculated at the low precision measurement processing, and the control unit 60 determines whether an error E between the time TF1 and the time TF2 is less than a reference value E0. Incidentally, the error E is expressed by the following expression: E=|TF1−TF2|. That is, the error E corresponds to an absolute value of the difference (the time TF1−the time TF1). When the error E is less than the reference value E0, the control unit 60 determines the time TF1 as the measurement value TF of the flight time to the pixel. When the error E is equal to or more than the reference value E0, the control unit 60 determines the time TF2 as the measurement value TF of the flight time to the pixel.

With respect to a pixel that the time TF2 is calculated with the low precision measurement processing instead of the time TF1, the control unit 60 determines the time TF2 of the pixel for each pixel as the measurement value TF of the flight time corresponding to the pixel. In addition, the control unit 60 calculates the distance D (corresponding to V×TF/2) to the front object 5 included in the pixel with respect to the pixel whose measurement value TF of the flight time is determined.

The processing moves to S240. The control unit 60 generates the distance image data describing the distance D of each pixel calculated at S200, and outputs the distance image data to the external device through the interface 70. The distance image data is, for example, configured from a data that a region of the pixel that the distance D is not calculated at S200 is blank or includes a prescribed maximum value. The control unit 60 executes the object recognition processing using the distance image data (S250), and ends the distance measurement processing temporarily.

The measurement apparatus 1 in the present embodiment is described. According to the measurement apparatus 1 in the present embodiment, the sampling period of the first converter 31 sampling the receiving signal at a high sampling frequency f1 is limited to a part of the standard measurement period, and a data amount of the first signal data generated by the first processing unit 41 and stored to the first memory 51 may be reduced. In order to determine the sampling period, the position of the front object 5 predicted based on the measurement value TF of the flight time obtained before the determination of the sampling period is used.

Therefore, according to the measurement apparatus 1 in the present embodiment, a region R2 where it is quite likely that the front object 5 exists among the front region R1, which is a measurable region, is selected. It is possible that the first memory 51 is caused to store the first signal data representing the receiving intensity of the reflected light from the region R2 selectively. In other words, it is possible to reduce data amount storing the first memory 51, and to measure the flight time of the light pulse reflected on the front object 5 irrespective of a distance to the front object 5 with high precision. Therefore, according to the present embodiment, it is possible to provide the measurement apparatus 1 measuring the distance with high precision using a low capacity memory.

In addition, according to the present embodiment, in order to limit the sampling period of the first converter 31 properly, the receiving signal of the second sampling frequency f2 is also sampled. The front object 5 existing in a distance measurable range (corresponding to the front region R1) is detected based on the sampling data of the receiving signal. When the difference between the candidate of the flight time (corresponding to the time TF1) calculated based on the first signal data and the candidate of the flight time (corresponding to the time TF2) calculated based on the second signal data is equal to or more than the reference value, the time TF2, which has a high reliability, is used as the measurement value TF of an authentic flight time instead of the time TF1 based on the first signal data. Therefore, according to the present embodiment, it is possible to prevent an improper setting of the sampling period and a strong noise caused during the sampling period or the like from affecting the following setting of the sampling period. It is possible to generate a high precision distance image data with less error.

Incidentally, the reference value may be based on a conversion error in the second converter 35, for example. The conversion error in the second converter 35 may originate from a sampling error caused by a sampling frequency f2 or the like. Since it is expected that the TF2 is within the conversion error, it may be appropriate to discard the time TF1 and to use the time TF2 when the difference between the time TF1 and the time TF2 is equal to or more than the reference value.

According to the present embodiment, the first processing unit 41 causes the first memory 51 to store the data generated by accumulating the receiving intensity of each time as the first signal data. The second processing unit 45 causes the second memory 55 to store the data generated by accumulating the receiving intensity of each time as the second signal data. The sampling data obtained by each of the multiple times of the emission operations of the light pulse represents the receiving intensity. The receiving intensities of each time are stored for each time. Based on the first signal data and the second signal data, the measurement value TF of the flight time is calculated. Thus, it is possible to reduce an influence of a noise and to measure the flight time with high precision as compared with a case where the measurement value TF of the flight time is calculated with a single pulse.

In the present embodiment, when the flight time is measured by referring information of the receiving intensity obtained by the multiple times of the emission operations of the light pulse, the processing is switched over according to the distance of the reflection point.

Specifically, the intermediate data generated by accumulating the receiving intensities corresponding to each time of the emission operations is referred when the times of the emission operations reaches a half (five times in the present embodiment), and the receiving time of the reflected light is detected and the sampling period is corrected based on the receiving time in a case where the reflection point is close to the measurement apparatus 1 and the receiving intensity is high enough at the half of the total number of times of the emission operations. With respect to the remaining emission operation (corresponding to the sixth to tenth emission operation in the present embodiment), the first signal data is generated based on the corrected sampling period.

Therefore, according to the present embodiment, even when the first converter 31 is operated to generate the sampling data by referring only a partial period of the standard measurement period, it is possible to measure the distance of the front object 5 of a short distance with high precision without failure basically. Thus, with respect to the front object 5 of a short distance, it is possible to prevent from failing the distance measurement with high precision due to an erroneous prediction of the position of the front object 5.

According to the present embodiment, the first converter 31 and the first processing unit 41 is prevented from operating with respect to the pixel that the front object 5 is not predicted to exist. The operation of the second converter 35 and the second processing unit 45 is completed with respect to the pixel that the reflected light has been detected according the determination at the time when the times of the emission reaches a half (corresponding to the fifth time of the emission operation) of the total number of times of the emission. Therefore, it is possible to reduce the energy consumption of the measurement apparatus 1.

According to the present embodiment, when the sampling period is determined, the motion of the front object 5 is predicted based on the distance image data obtained until a time of the determination, in other words, based on the measurement value TF of the flight time for each pixel, using a known prediction technology. It is determined that the sampling period for each pixel corresponds to the prediction position of the front object 5 included in the pixel.

Specifically, the sampling period is determined by considering the motion of the front object 5 moving across the pixels. Furthermore, with respect to a pixel that it is predicted that multiple front objects 5 overlap each other, the sampling period of the pixel is determined on a basis of the front object 5 (that is, the closest front object) which is positioned to the closest position to the measurement apparatus. Therefore, it is possible to determine the sampling period properly even when the front object 5 is a moving object such as a person and a vehicle, which move freely.

This type of the determination of the sampling period may be effective when the moving object is positioned behind a static object. According to the present embodiment, with respect to the pixel including the static object, the sampling period is determined to exclude the receiving period of the light pulse corresponding to a rear region of the static object as the reflection point. A overlapping of two moving object may be solved in a short time. However, when two front objects 5 are both static objects, the overlapping of the two front objects 5 may continue for a long time. Therefore, the determination procedure of the sampling period may be especially effective with respect to the distance measurement to the front object 5 with high precision.

Although the embodiment of the present disclosure is explained, it should be noted that the present disclosure is not limited the described embodiment, and that the present disclosure may has various modifications.

In the present embodiment, the analog-to-digital converter is provided to the sampling frequencies f1, f2. However, a single analog-to-digital converter may be provided. For example, a configuration of a measurement apparatus 100 having the single analog-to-digital converter of a modification will be described in FIG. 11.

The measurement apparatus 100 in the modification has a single common converter 130 instead of the first converter 31 and the second converter 35, an extraction unit 131, and a thinning out unit 135. The measurement apparatus 100 in the modification has the same configuration of the measurement apparatus 1 in the present embodiment other than the above features. Therefore, in the following explanation, a configuration of the common converter 130, the extraction unit 131, and the thinning out unit 135 will be intensively explained as the explanation of the measurement apparatus 100 in the modification. The common converter 130 corresponds to an example of an output circuit in the present disclosure.

The common converter 130 is an analog-to-digital converter. The common converter 130 samples the receiving signal of each pixel inputted from the light receiving unit 20 and generates the sampling data of each pixel. The common converter 130 samples the receiving signal at the first sampling frequency f1 for each pixel similar to the first converter 31. Incidentally, the first sampling frequency f1 is determined in advance. The common converter 130 inputs the sampling data, which corresponds to the receiving signal, to the extraction unit 131 and the thinning out unit 135.

The extraction unit 131 extracts a data part (corresponding to the extracted data) corresponding to the sampling period set up by the control unit 60 from the sampling data, which is outputted from the common converter 130. The extraction unit 131 inputs the extracted data to the first processing unit 41. The extracted data is substantially identical with the sampling data inputted from the first converter 31 to the first processing unit 41. The first processing unit 41 generates the first signal data using the extracted data similar to the present embodiment.

The thinning out unit 135 corresponds to a down sampling circuit. The thinning out unit 135 performs a thinning out processing for a sampling data outputted from the common converter 130. The thinning out unit 135 generates a sampling data whose sampling frequency is equal to the second sampling frequency f2 virtually. The sampling data corresponds to a thinning out data. The thinning out data is inputted to the second processing unit 45. The thinning out data is substantially identical with the sampling data inputted from the second converter 35 to the second processing unit 45. For example, the thinning out data may be generated by the following processing. For example, the thinning out unit 135 thins out a sampling value of one receiving signal for each time 1/f1 inputted from the common converter 130 at an interval of a time 1/f2 to generate a thinning out target. The thinning out data may be generated by destroying the sampled values other than the thinning out target. The second processing unit 45 generates the second signal data using the thinning out data similar to the present embodiment.

According to the measurement apparatus 100 in the modification, it may be unnecessary to provide the analog-to-digital converter for each of the sampling frequencies f1, f2.

In the measurement apparatus 1 in the present embodiment, the sampling period is set up to the first converter 31. The first converter 31 determines a period for sampling the receiving signal. The measurement apparatus 1 may be configured that the first converter 31 samples the receiving signal in the standard measurement period and generates the sampling data, and the first processing unit 41 selectively uses data corresponding to the sampling period with respect to the sampling data inputted from the first converter 31 and generates the first signal data. The extraction unit 131 of the measurement apparatus 100 in the modification may be provided between the first converter 31 and the first processing unit 41 of the measurement apparatus 1. Alternatively, the first processing unit 41 may has a function corresponding to the extraction unit 131.

In the present embodiment, the first signal data and the second signal data are stored to different memories (that is, the first memory 51 and the second memory 55). The measurement apparatuses 1, 100 may store the first signal data and the second signal data to a single common memory instead of the first memory 51 and the second memory 55.

According to the present embodiment, the high precision measurement processing is not performed at the initial distance measurement processing. Alternatively, the measurement apparatus 1 may perform the high precision measurement processing using a preset sampling period at the initial distance measurement processing.

The light emission unit 10 and the light receiving unit 20 correspond to an example of a transceiver. The first memory 51 and the second memory 55 correspond to an example of a memory portion. The first converter 31, the second converter 35, the first processing unit 41 and the second processing unit 45 correspond to an example of a sampling portion. The common converter 130, the extraction unit 131, the thinning out unit 135, the first processing unit 41, and the second processing unit 45 also correspond to an example of the sampling portion. The first processing unit 41 (and the extraction unit 131) corresponds to an example of the first processing unit. The second processing unit 45 (and the thinning out unit 135) corresponds to an example of a second processing unit.

It is noted that a flowchart or a processing of the flowchart in the present embodiment includes steps (also referred to as sections), each of which is represented, for example, as S110. Further, each step may be divided into several sub-steps, and several steps may be combined into a single step. Furthermore, each of the configured steps may be also referred to as a device, module, or means.

Functions realized by S190, S200, S220, S230, and S240 performed by the control unit 60 correspond to an example of functions realized by a measurement portion. Functions realized by S120 to S170, and S250 performed by the control unit 60 correspond to an example of functions realized by a determination portion.

According to one aspect of the present disclosure, a measurement apparatus measuring a flight time of a search wave corresponding to a time from an emission of the search wave to a receiving of a reflected wave is provided. The measurement apparatus includes a transceiver, a memory portion, a sampling portion, a measuring portion, and a determination portion. The transceiver emits the search wave and receives the reflected wave.

The sampling portion generates a sampling data of a receiving signal obtained by the transceiver and causes the memory portion to store the sampling data.

The sampling portion includes a first processing unit and a second processing unit. The first processing unit causes the memory portion to store the sampling data, which is generated by sampling the receiving signal at a first sampling frequency, as a first signal data, and the second processing unit causes the memory portion to store the sampling data, which is generated by sampling the receiving signal at a second sampling frequency, as a second signal data. The second sampling frequency is lower than the first sampling frequency.

The measurement portion measures the flight time based on the first signal data and the second signal data to generate a measurement value of the flight time. The determination portion determines a sampling period of the receiving signal corresponding to the first signal data based on the measurement value of the flight time.

The first processing unit causes the memory portion to selectively store the sampling data of the receiving signal in a specific period with an emission event of the search wave as a reference as the first signal data. The specific period corresponds to the sampling period determined by the determination portion.

According to the measurement apparatus, the sampling period of the first processing unit to sample the receiving signal at a high sampling frequency is limited, and a data amount of the first signal data stored to the memory portion may be reduced. When the sampling period is determined, the measurement value of the flight time obtained before the determination of the sampling period is used.

Therefore, according to the measurement apparatus, a high possibility region where the front object likely exists may be selected among the front region where the search wave is emitted. It is possible that the memory portion stores the sampling data as the first signal data. The sampling data corresponds to the receiving signal of the reflected wave from the high possibility region. The high possibility region corresponds to a region where the front object likely exists. Thus, according to the present disclosure, it may be possible to measure the flight time of the light pulse reflected on the front object irrespective of a distance to the front object with high precision, and to reduce data amount stored for measuring the distance.

In addition, the measurement portion outputs a measurement value of a distance from the measurement apparatus to a front object based on the measurement value of the flight time. The front object reflects the search wave. According to the measurement apparatus including the measurement portion, it is possible to output the measurement value with high precision with respect to a distance to the front object.

In addition, when a difference between the flight time represented by the first signal data and the flight time represented by the second signal data is equal to or more than a reference value, the measurement portion selectively uses the second signal data of the first signal data and the second signal data and calculates the measurement value of the flight time.

In addition, the measurement portion calculates a first candidate of the flight time based on the first signal data, the measurement portion calculates a second candidate of the flight time based on the second signal data. When a difference between the first candidate of the flight time and the second candidate of the flight time is less than a reference value, the measurement portion selects the first candidate of the flight time as the measurement value of the flight time. When the difference between the first candidate of the flight time and the second candidate of the flight time is equal to or more than the reference value, the measurement portion selects the second candidate of the flight time as the measurement value of the flight time.

According to this configuration, when the determination portion determines the sampling period improperly, it is possible to prevent the first signal data from being influenced and to prevent the measurement portion from calculating an improper value as the measurement value of the flight time.

The transceiver emits a light pulse as the search wave. The transceiver receives the reflected light of the light pulse for each pixel defined by dividing a front visual field receiving the reflected light. The first processing unit causes the memory portion to store the first signal data generated based on the receiving signal received by the transceiver for each pixel. The second processing unit causes the memory portion to store the second signal data generated based on the receiving signal received by the transceiver for each pixel. The measurement portion measures the flight time of the light pulse based on the first signal data and the second signal data for each pixel. The determination portion determines the sampling period for each pixel based on the measurement value of the flight time obtained by each pixel.

According to the measurement apparatus, it is possible to measure the flight time of the light pulse reflected on each front object, which is positioned to the front region in a horizontal direction, with high precision.

The determination portion predicts a motion of the front object reflecting the light pulse based on the measurement value of the flight time of each pixel. The determination portion determines the sampling period of each pixel based on a prediction result of the motion (e.g. across pixels) of the front object. The determination portion causes the memory portion to store the sampling data corresponding to the receiving signal of the light pulse reflected by the front object as the first signal data.

According to the measurement apparatus, it is possible to determine the sampling period of each pixel properly, for example, considering that the front object moves across pixels. Therefore, it is possible to measure the flight time of the light pulse with respect to each front object more precisely.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A measurement apparatus measuring a flight time of a search wave corresponding to a time after the search wave is emitted and before a reflected wave of the search wave is received, the measurement apparatus comprising:
   a transceiver emitting the search wave, receiving the reflected wave, and outputting a receiving signal;
   a memory portion;
   a sampling portion generating a sampling data of the receiving signal and causing the memory portion to store the sampling data, wherein the sampling portion includes
      a first processing unit causing the memory portion to store the sampling data generated by sampling the receiving signal at a first sampling frequency as a first signal data, and
      a second processing unit causing the memory portion to store the sampling data generated by sampling the receiving signal at a second sampling frequency, which is lower than the first sampling frequency, as a second signal data;
   a measurement portion measuring the flight time based on the first signal data and the second signal data and generating a measurement value of the flight time; and
   a determination portion determining a sampling period of the receiving signal corresponding to the first signal data based on the measurement value of the flight time, wherein
   the first processing unit causes the memory portion to selectively store the sampling data of the receiving signal in a specific period with an emission event of the search wave as a reference, as the first signal data, the first processing unit and the second processing unit operating in parallel,
   the specific period corresponds to the sampling period determined by the determination portion,
   the second processing unit causes the memory portion to store, as the second signal data, the sampling data generated by sampling the receiving signal, the sampling data corresponding to a period longer than the specific period and including the specific period, and
   the measurement portion selects, as the measurement value of the flight time, either the flight time calculated based on the first signal data or the flight time calculated based on the second signal data.

2. The measurement apparatus according to claim 1, wherein
   the measurement portion outputs a distance from the measurement apparatus to a front object reflecting the search wave based on the measurement value of the flight time.

3. The measurement apparatus according to claim 1, wherein
   the determination portion determines the sampling period including an estimated time when the transceiver receives the reflected wave, which corresponds to the search wave emitted at a next measurement, based on the measurement value of the flight time.

4. The measurement apparatus according to claim 1, wherein
   the measurement portion selects, as the measurement value of the flight time, the flight time calculated based on the first signal data in response to a determination that the an error between the flight time calculated based on the first signal data and the flight time calculated based on the second signal data is less than a predetermined reference value, and
   the measurement portion selects, as the measurement value of the flight time, the flight time calculated based on the second signal data in response to a determination that the error between the flight time calculated based on the first signal data and the flight time calculated based on the second signal data is equal to or greater than a predetermined reference value.

5. The measurement apparatus according to claim 1, wherein
   the measurement portion determines a reliability of the flight time calculated based on the first signal data and determines a reliability of the flight time calculated based on the second signal data, and
   the measurement portion selects, as the measurement value of the flight time, one of the flight time calculated based on the first signal data and the flight time calculated based on the second signal data determined to have a greater reliability.

6. A measurement apparatus measuring a flight time of a search wave corresponding to a time after the search wave is emitted and before a reflected wave of the search wave is received, the measurement apparatus comprising:
- a transceiver emitting the search wave, receiving the reflected wave, and outputting a receiving signal;
- a memory portion;
- a sampling portion generating a sampling data of the receiving signal and causing the memory portion to store the sampling data, wherein the sampling portion includes
  - a first processing unit causing the memory portion to store the sampling data generated by sampling the receiving signal at a first sampling frequency as a first signal data, and
  - a second processing unit causing the memory portion to store the sampling data generated by sampling the receiving signal at a second sampling frequency, which is lower than the first sampling frequency, as a second signal data;
- a measurement portion measuring the flight time based on the first signal data and the second signal data and generating a measurement value of the flight time; and
- a determination portion determining a sampling period of the receiving signal corresponding to the first signal data based on the measurement value of the flight time, wherein the first processing unit causes the memory portion to selectively store the sampling data of the receiving signal in a specific period with an emission event of the search wave as a reference, as the first signal data, the specific period corresponds to the sampling period determined by the determination portion, the measurement portion calculates the measurement value of the flight time based on the first signal data and the second signal data, and the measurement portion selectively refers to the second signal data and calculates the measurement value of the flight time based on the second signal data when a difference between the flight time represented by the first signal data and the flight time represented by the second signal data is equal to or more than a reference value.

7. A measurement apparatus measuring a flight time of a search wave corresponding to a time after the search wave is emitted and before a reflected wave of the search wave is received, the measurement apparatus comprising:
- a transceiver emitting the search wave, receiving the reflected wave, and outputting a receiving signal;
- a memory portion;
- a sampling portion generating a sampling data of the receiving signal and causing the memory portion to store the sampling data, wherein the sampling portion includes
  - a first processing unit causing the memory portion to store the sampling data generated by sampling the receiving signal at a first sampling frequency as a first signal data, and
  - a second processing unit causing the memory portion to store the sampling data generated by sampling the receiving signal at a second sampling frequency, which is lower than the first sampling frequency, as a second signal data;
- a measurement portion measuring the flight time based on the first signal data and the second signal data and generating a measurement value of the flight time; and
- a determination portion determining a sampling period of the receiving signal corresponding to the first signal data based on the measurement value of the flight time, wherein the first processing unit causes the memory portion to selectively store the sampling data of the receiving signal in a specific period with an emission event of the search wave as a reference, as the first signal data, the specific period corresponds to the sampling period determined by the determination portion, the measurement portion calculates a first candidate of the flight time based on the first signal data, the measurement portion calculates a second candidate of the flight time based on the second signal data, the measurement portion selects the first candidate of the flight time as the measurement value of the flight time when a difference between the first candidate of the flight time and the second candidate of the flight time is less than a reference value, and the measurement portion selects the second candidate of the flight time as the measurement value of the flight time when the difference between the first candidate of the flight time and the second candidate of the flight time is equal to or more than the reference value.

8. A measurement apparatus measuring a flight time of a search wave corresponding to a time after the search wave is emitted and before a reflected wave of the search wave is received, the measurement apparatus comprising:
- a transceiver emitting the search wave, receiving the reflected wave, and outputting a receiving signal;
- a memory portion;
- a sampling portion generating a sampling data of the receiving signal and causing the memory portion to store the sampling data, wherein the sampling portion includes
  - a first processing unit causing the memory portion to store the sampling data generated by sampling the receiving signal at a first sampling frequency as a first signal data, and
  - a second processing unit causing the memory portion to store the sampling data generated by sampling the receiving signal at a second sampling frequency, which is lower than the first sampling frequency, as a second signal data;
- a measurement portion measuring the flight time based on the first signal data and the second signal data and generating a measurement value of the flight time; and
- a determination portion determining a sampling period of the receiving signal corresponding to the first signal data based on the measurement value of the flight time, wherein the first processing unit causes the memory portion to selectively store the sampling data of the receiving signal in a specific period with an emission event of the search wave as a reference, as the first signal data, the specific period corresponds to the sampling period determined by the determination portion, the sampling portion includes an output circuit, which samples the receiving signal at the first sampling frequency and outputs the sampling data corresponding to the receiving signal, the first processing unit extracts a data part corresponding to the specific period from the sampling data outputted from the output circuit as the first signal data, and the second processing unit thins out the sampling data outputted from the output circuit as the second signal data.

9. A measurement apparatus measuring a flight time of a search wave corresponding to a time after the search wave is emitted and before a reflected wave of the search wave is received, the measurement apparatus comprising:
- a transceiver emitting the search wave, receiving the reflected wave, and outputting a receiving signal;
- a memory portion;
- a sampling portion generating a sampling data of the receiving signal and causing the memory portion to store the sampling data, wherein the sampling portion includes
  - a first processing unit causing the memory portion to store the sampling data generated by sampling the receiving signal at a first sampling frequency as a first signal data, and
  - a second processing unit causing the memory portion to store the sampling data generated by sampling the receiving signal at a second sampling frequency, which is lower than the first sampling frequency, as a second signal data;
- a measurement portion measuring the flight time based on the first signal data and the second signal data and generating a measurement value of the flight time; and
- a determination portion determining a sampling period of the receiving signal corresponding to the first signal data based on the measurement value of the flight time, wherein the first processing unit causes the memory portion to selectively store the sampling data of the receiving signal in a specific period with an emission event of the search wave as a reference, as the first signal data, the specific period corresponds to the sampling period determined by the determination portion, the first processing unit causes the memory portion to store the first signal data, the first signal data is generated by accumulating a receiving intensity represented by the sampling data for each time with the emission event of the search wave as a reference, the sampling data for the first signal data is obtained by sampling the receiving signal in the specific period at the first sampling frequency at a plurality of emission operations of the search wave, the second processing unit causes the memory portion to store the second signal data, the second signal data is generated by accumulating the receiving intensity represented by the sampling data for each time with the emission event of the search wave as a reference, the sampling data for the second signal data is obtained by sampling the receiving signal at the second sampling frequency at the plurality of emission operations of the search wave, the measurement portion refers to the receiving intensity represented by the first signal data and the receiving intensity represented by the second signal data at each time and measures the flight time each time when the plurality of emission operations are completed, the second processing unit generates an intermediate data each time when an emission operation of the search wave is performed from an initiation to a completion of the plurality of the emission operations, the intermediate data is generated by accumulating the receiving intensity represented by the sampling data obtained from an initial emission operation to a current emission operation for each time with the emission event of the search wave as a reference, the measurement portion corrects the sampling period including the receiving time when the reflected wave is received in a case where the measurement portion detects that the reflected wave is received based on the receiving intensity represented by the intermediate data of each time at a prescribed time in a period of the plurality of the emission operations, the first processing unit causes the memory portion to store the first signal data when the sampling period is corrected in the period of the plurality of the emission operations, the first signal data is generated by accumulating the receiving intensity represented by the sampling data for each time with the emission event of the search wave as a reference, and the sampling data is generated by a remaining emission operation performed after the prescribed time, and obtained by sampling the receiving signal corresponding to a corrected sampling period corrected by the measurement portion at the first sampling frequency.

10. The measurement apparatus according to claim 9, wherein
the measurement portion stops operating the second processing unit considering the intermediate data as the second signal data, which is completed, when the measurement portion detects that the reflected wave is received at the prescribed time.

11. A measurement apparatus measuring a flight time of a search wave corresponding to a time after the search wave is emitted and before a reflected wave of the search wave is received, the measurement apparatus comprising:
- a transceiver emitting the search wave, receiving the reflected wave, and outputting a receiving signal;
- a memory portion;
- a sampling portion generating a sampling data of the receiving signal and causing the memory portion to store the sampling data, wherein the sampling portion includes
  - a first processing unit causing the memory portion to store the sampling data generated by sampling the receiving signal at a first sampling frequency as a first signal data, and
  - a second processing unit causing the memory portion to store the sampling data generated by sampling the receiving signal at a second sampling frequency, which is lower than the first sampling frequency, as a second signal data;
- a measurement portion measuring the flight time based on the first signal data and the second signal data and generating a measurement value of the flight time; and
- a determination portion determining a sampling period of the receiving signal corresponding to the first signal data based on the measurement value of the flight time, wherein the first processing unit causes the memory portion to selectively store the sampling data of the receiving signal in a specific period with an emission event of the search wave as a reference, as the first signal data, the specific period corresponds to the sampling period determined by the determination portion, the transceiver emits a light pulse as the search wave, the transceiver receives a reflected light of the light pulse for each pixel defined by dividing a front visual field receiving the reflected light, the first processing unit causes the memory portion to store the first signal data generated based on the receiving signal received by the transceiver for each pixel, the second processing unit causes the memory portion to store the second signal data generated based on the receiving signal received by the transceiver for each pixel, the measurement portion measures the flight time of the light pulse based on the first signal data and the second signal data for each pixel, the determination portion determines the sampling period for each pixel based on the measurement value of the flight time obtained by each pixel, the determination portion predicts a motion of a front object reflecting the light pulse based on the measurement value of the flight time of each pixel, the determination portion determines the sampling period of each pixel based on a prediction result of the motion of the front object, and the determination portion causes the memory portion to store the sampling data corresponding to the receiving signal of the light pulse reflected by the front object as the first signal data.

12. The measurement apparatus according to claim 11, wherein when a plurality of front objects are predicted to overlap in a pixel, the determination portion determines the sampling period of the pixel and causes the memory portion to store the sampling data as the first signal data, and the sampling data corresponds to the receiving signal of the light pulse reflected by the front object positioned to a nearest position to the measurement apparatus among the plurality of the front objects predicted to overlap.

13. The measurement apparatus according to claim 11, wherein the determination portion prevents the first processing unit from operating with respect to a pixel in which the front object is not predicted to exist.

* * * * *